Jan. 15, 1963 P. L. STANTON 3,073,298
RESPIRATORY DEVICE
Filed March 12, 1959 4 Sheets-Sheet 1
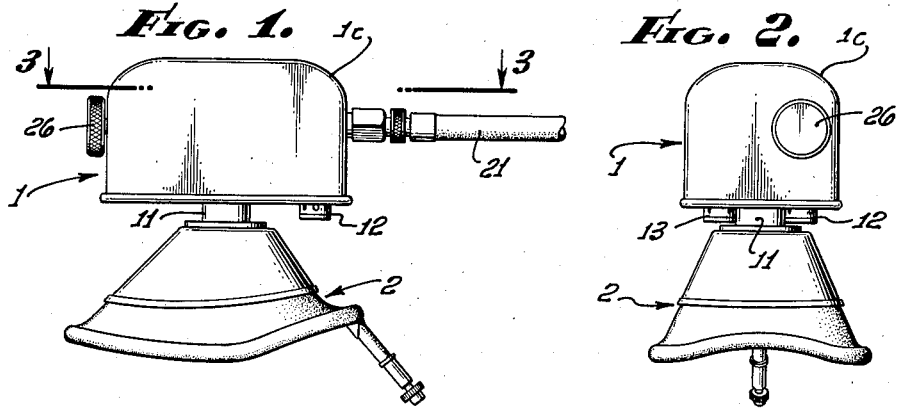
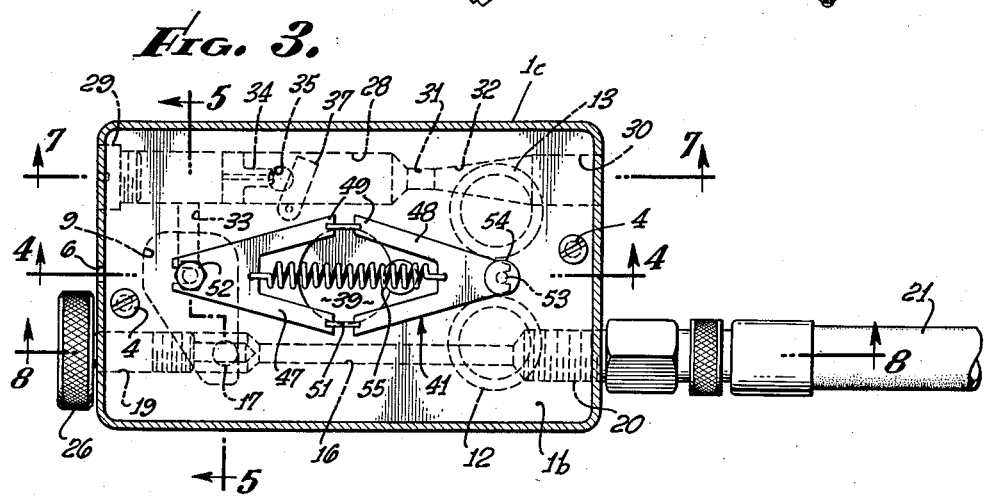
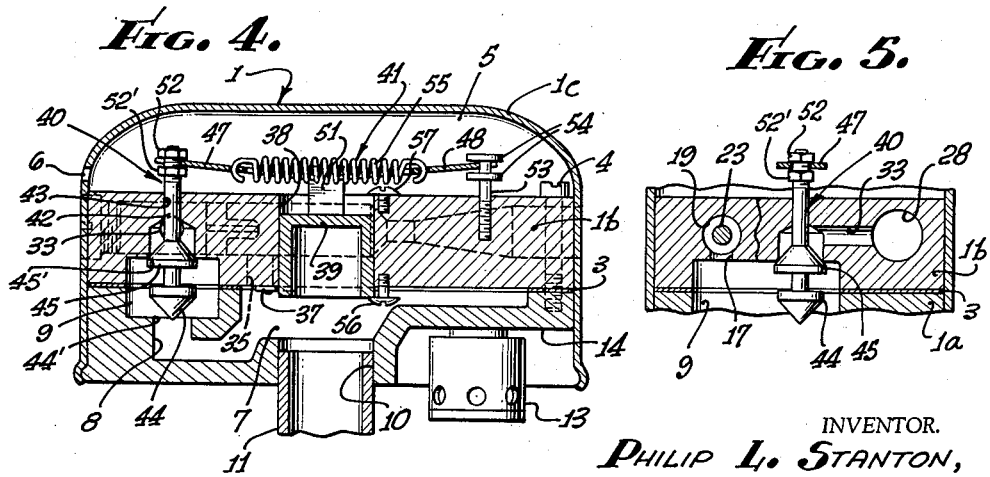
INVENTOR.
PHILIP L. STANTON,
BY
Paul A. Weilein
ATTORNEY.

INVENTOR.
PHILIP L. STANTON,
BY
Paul A. Weilein
ATTORNEY.

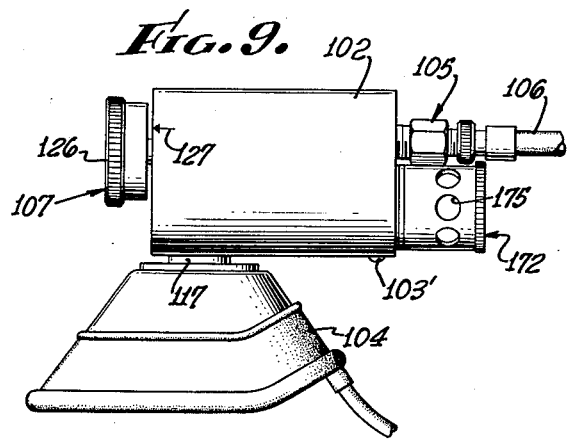
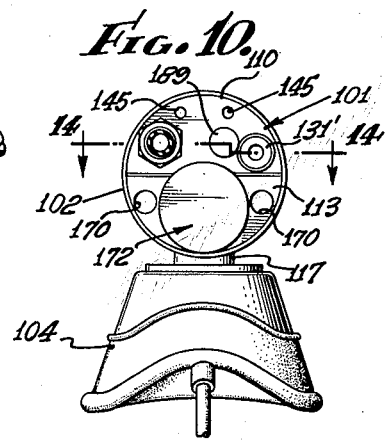
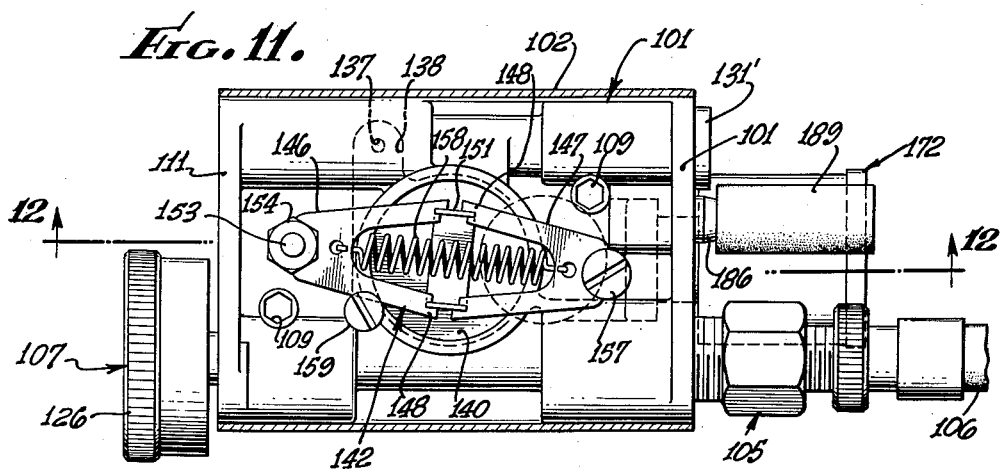
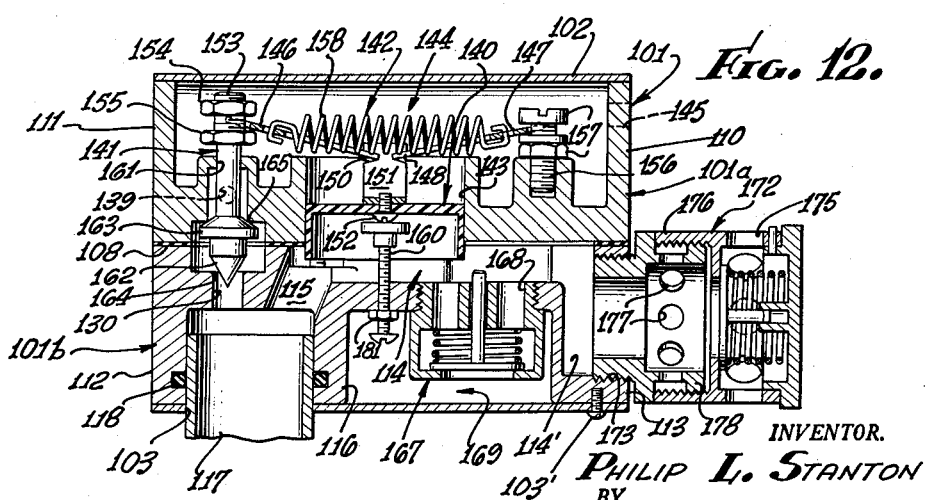
INVENTOR.
PHILIP L. STANTON
BY
Paul A. Weilein
ATTORNEY.

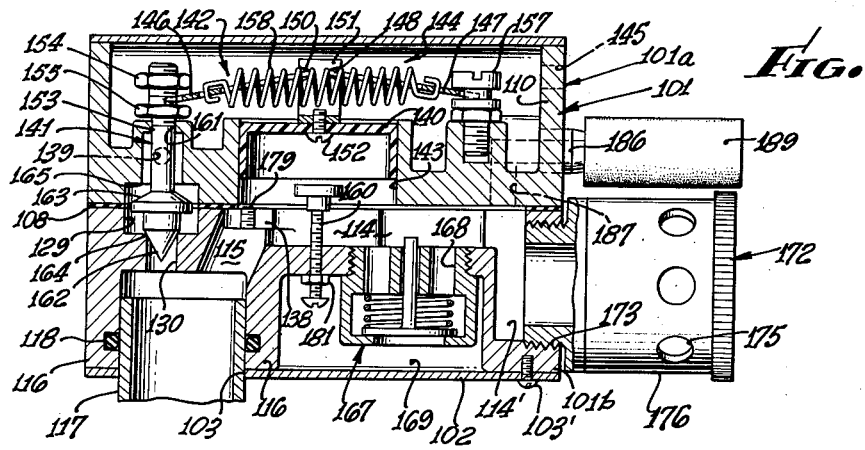
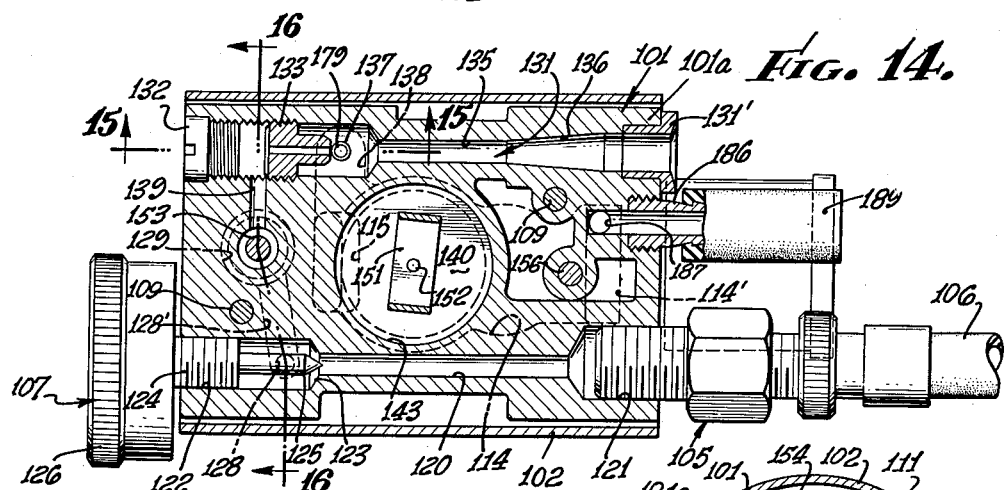
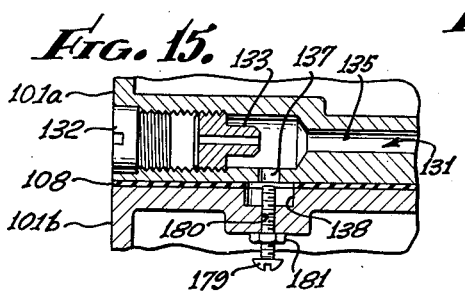
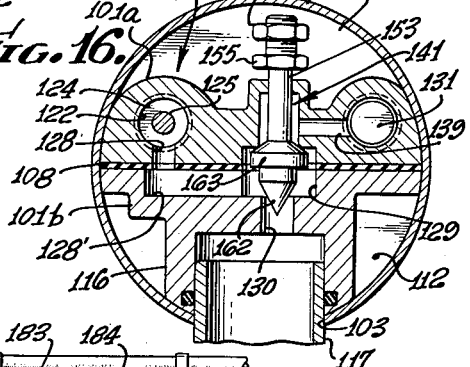
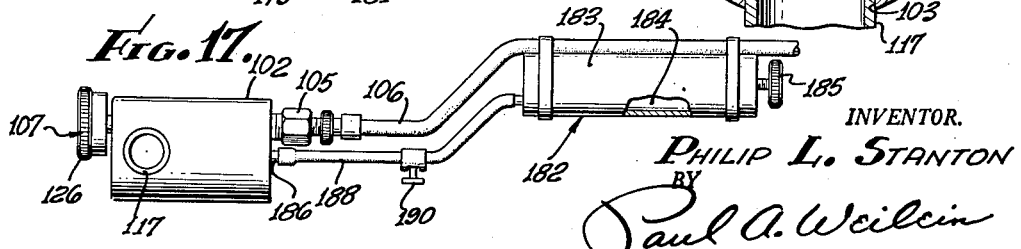

United States Patent Office

3,073,298
Patented Jan. 15, 1963

3,073,298
RESPIRATORY DEVICE
Philip L. Stanton, 389 Flintridge Oaks, Pasadena, Calif.
Filed Mar. 12, 1959, Ser. No. 799,053
6 Claims. (Cl. 128—29)

This invention relates to respiratory apparatus of the pulmometric type forming the subject matter of my pending application for U.S. Letters Patent, Serial No. 723,174, filed March 24, 1958, and now abandoned, for Resuscitator Mechanism, of which this is a continuation-in-part.

In that pending application the respiratory apparatus includes a bodily movable element such as a small pulmometrically controlled, gas-operated piston for actuating means for controlling the flow of gas from a source to and from a patient.

Under conditions in which present-day resuscitators and related respiratory devices are employed in hospitals and for rescue and first aid operations, particularly in connection with treating newly born infants, considerable difficulty is experienced in manipulating the head, neck and body of the infant to provide an open passageway to the lungs while at the same time properly operating the resuscitator and mask or other means for an efficient administering of gas to the patient. This difficulty is encountered by reason of the size, weight and bulk of present-day resuscitators and the time required properly to manipulate the patient and the resuscitator to assure efficient use of the latter. In some cases the time factor is vitally important since loss of but a few moments in properly applying the resuscitator may result in death of the patient or cause severe damage to the patient's brain.

Not only in the case of treating infants is it essential that the respiratory device be small, compact and of light weight. In all critical life-saving applications, a respiratory device that is small and light as to weight, will provide for the vitally necessary freedom of action of the operator that will assure a quick and proper application of the resuscitator to the patient.

Up to and including the present time, with respiratory devices such as resuscitators, insufflators, and therapeutic devices of the type to which this invention relates, it has been the practice to provide a pressure responsive diaphragm for actuating the control mechanism. A diaphragm of small size, for example less than one and one-half inches in diameter does not provide the accuracy and reliability of control necessary for safe and efficient operation. Consequently, the larger the diaphragm, the more sensitive and reliable the control. Due to the use of such diaphragms, the housings or bodies of present-day devices have been generally of such bulk and weight that they have proved a disadvantage in instances such as above noted.

It is an object of the present invention to provide a resuscitator or other respiratory device which eliminates the objections and disadvantages that attended the use of devices heretofore available, this being accomplished through the instrumentality of novel control mechanism of smaller size, less weight and greater reliability of performance than heretofore provided.

It is another object of this invention to provide a respiratory device in which the advantages herein noted are obtained by the use of a novel bodily movable pressure responsive element.

Another object of this invention is the provision in a respiratory device such as described, of a novel piston and cylinder unit which takes the place of a diaphragm in such a manner that the mechanism as a whole may be greatly reduced in size, bulk and weight, compared to present-day resuscitators.

An additional object of this invention is to provide a respirator mechanism such as next above noted wherein the piston may be less than one inch in diameter, to the end that the body of the resuscitator enclosing the entire mechanism, also the control elements associated with the piston may be correspondingly reduced in size, bulk and weight, thereby providing the advantages hereinbefore mentioned in a particularly efficacious manner.

It is a further object of this invention to provide a unit such as described which is of small elongated form, thereby making it possible to hold the resuscitator in one hand and manipulate control means thereof with the same hand, also making it possible to install the unit in a gas supply hose leading to the mask or other administering means, if this be desired.

It is another object of this invention to provide a resuscitator of the character described wherein the body thereof, apart from the housing therefor, is a self-contained resuscitator unit carrying all of the parts and controls necessary for cyclical operation, with the controls located and relatively arranged so that when the body is removed from the housing, it may be cyclically operated and the controls readily adjusted during such operation, thereby facilitating factory adjustments and tests necessary to prepare the resuscitator for the market.

Another object of the invention is to provide a resipratory device of the character described and claimed in the aforementioned application Serial No. 723,174, wherein an elongate, small and compact body readily may be die cast with all formations necessary to provide the required chambers and passages in a body of minimum bulk and weight, and wherein this body readily may be housed in an elongate open-ended tubular housing of small compass. In accordance with this objective, the ends of the housing are closed by end portions of the body so that no part of the latter projects from the housing. The end portions of the body are employed to mount the controls and necessary fittings, and an opening in the housing adjacent one end thereof provides for operatively connecting a mask or an endo-tracheal tube. This arrangement leaves unobstructed the major portion of the housing which therefore serves as a convenient handle and makes it possible to adjust the controls with the fingers of the hand that holds the resuscitator and applies it to the patient.

Other objects and advantages of the invention will be hereinafter described or will become apparent to those skilled in the art, and the novel features of the invention will be defined in the appended claims.

Referring to the drawings:
FIG. 1 is a side elevation of respiratory mechanism embodying the present invention;
FIG. 2 is an end elevation of the mechanism shown in FIG. 1;
FIG. 3 is a sectional view taken on the line 3—3 of FIG. 1, on an enlarged scale;
FIG. 4 is a sectional view taken on the line 4—4 of FIG. 3;
FIG. 5 is a fragmentary cross sectional view taken on the line 5—5 of FIG. 3 on a reduced scale;
FIG. 6 is a sectional view corresponding to FIG. 4 showing parts of the mechanism in a different position than in FIG. 4;
FIG. 7 is a sectional view taken on the line 7—7 of FIG. 3;
FIG. 8 is a fragmentary sectional view taken on the line 8—8 of FIG. 3;
FIG. 9 is a side elevation of a respiratory mechanism functionally similar to that of FIGS. 1 through 8, but of a modified configuration and construction;
FIG. 10 is an end elevation, looking toward the right end in FIG. 9;
FIG. 11 is an enlarged top plan view of the body of the device of FIG. 9, with the housing shown in section;

FIG. 12 is a sectional view taken on the line 12—12 of FIG. 11, showing the valve means in one operative position;

FIG. 13 is a sectional view corresponding to FIG. 12, showing the valve means in another position;

FIG. 14 is a sectional view taken on the line 14—14 of FIG. 10;

FIG. 15 is a fragmentary sectional view taken on the line 15—15 of FIG. 14;

FIG. 16 is a sectional view taken on the line 16—16 of FIG. 14; and

FIG. 17 is a side elevational view showing how the device may be used with control means in the form of an auxiliary expansion chamber.

Figure 6:
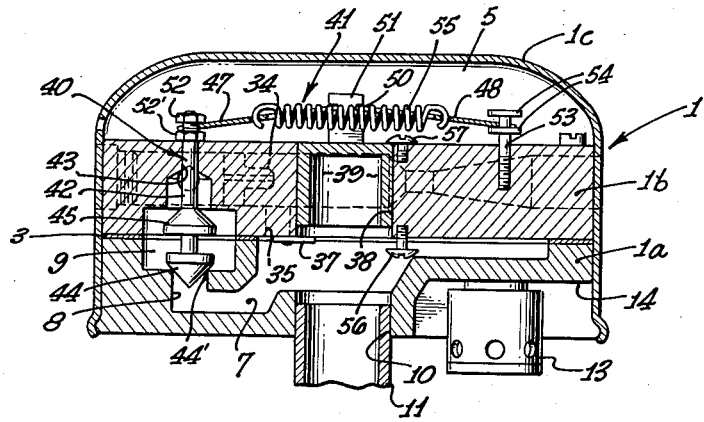

As shown in the accompanying drawings, respiratory mechanism embodying the present invention includes a compact "pocket size" body 1 which contains all of the mechanism and controls required for efficient operation as a resuscitator when connected with a supply of gas under pressure and means for communicating the mechanism with the lungs of a patient. It will be understood that the invention contemplates respiratory apparatus other than mere resuscitators, however, as will hereinafter become more fully apparent. Due to the small size and shape of the body 1 it may be mounted, as here shown, so as to be supported by a mask 2, or may be embodied in the gas supply line leading to the mask or other gas administering means in a manner not here shown, but which is believed to be obvious to persons skilled in the art.

In the form shown in FIGS. 1–8, the body 1 is rectangular and composed of a lower section 1a, an upper section 1b and a cover 1c. The sections 1a and 1b are secured together with a gasket 3 therebetween by means of screw fastenings 4. The cover 1c may be made of a suitable plastic material and has a dome-shaped top wall. It is constructed to embrace the top and sides of the body, being cemented or otherwise secured in place on the body. The dome formation provides a chamber 5 atop the body. This chamber is communicated with the atmosphere through an opening 6 in the cover.

The lower section 1a of the body is provided with a main chamber 7 which through a port 8 communicates with a valve chamber 9 formed in the two body sections. The lower body section 1a is also provided with a port 10 for communication with the mask 2. A tubular extension 11 on the mask fits in the port 10 whereby the main chamber 7 is communicated with the mask.

Connected with the body 1 so as to communicate with the main chamber 7 are a negative pressure safety valve 12 and a positive pressure safety valve 13, these valves being conventional in resuscitators. In order to economize space and weight, the lower body section 1a is cut away or recessed on its under side as at 14, to provide a space accommodating the safety valves.

The sections 1a and 1b of the body 1 are provided with passage means for introducing gas under pressure into the main chamber 7 for delivery to the patient. This passage means, as clearly shown in FIG. 8, includes an intake passage 16, a port 17, the valve chamber 9, also the port 8 between the chamber 9 and the main chamber 7. The intake passage 16 extends through the body section 1b from an intake port 18 at one end of this body section to an enlarged portion 19 of the passage at the other end of this body section. The intake port 18 is adapted to be connected as at 20 with a gas supply hose 21 leading from a supply of gas under pressure, not shown. The port 17 (see FIG. 8) communicates the valve chamber 9 with the passage 16 at a point beyond a valve seat 21' formed in this passage.

A needle-type control valve 22 is operable in the enlarged portion 19 of the passage 16 in cooperation with the seat 21' to control the flow of gas into the resuscitator mechanism. The stem 23 of this valve is mounted in a bearing 24 in the enlarged portion 19 of the passage 16. An enlarged screw threaded portion 25 on the stem 23 is threadedly engaged with screw threads in the enlarged portion 19 whereby the knurled handle 26 on the outer end of this stem may be manipulated to actuate the control valve. In this connection it should be noted that the handle 26 conveniently may be manipulated with fingers of the operator's hand holding the body 1 with the mask 2 attached thereto.

Venturi means are provided in the body 1 for creating a partial vacuum or negative pressure in the main chamber 7 and in the lungs of the patient, in effecting the exhalation phase of a resuscitation operation. In the present embodiment of this invention the venturi means also serves to vent gas to the atmosphere on the inhalation and exhalation phases of operation of the resuscitator mechanism, for the purpose to be hereinafter described.

Figure 7:
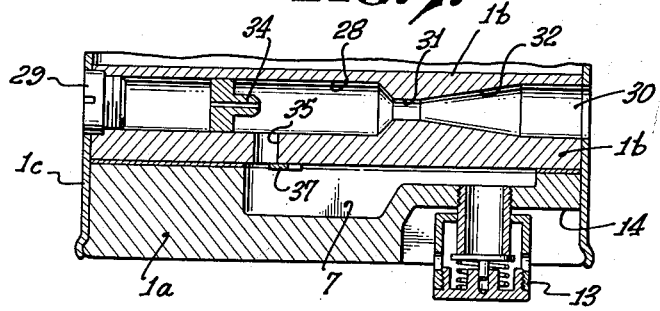
Figure 8:
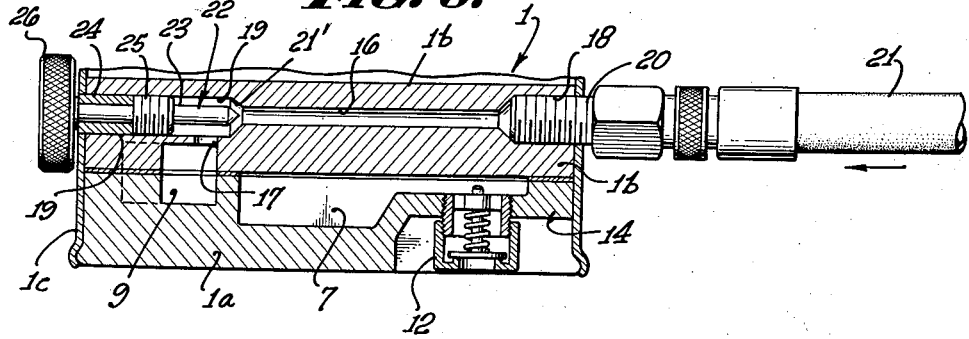

As shown in FIGS. 3 and 7, the venturi means include a venturi passage 28 extending longitudinally through the upper body section 1b. One end of this passage is closed by a plug 29, whereas the other end is open as at 30 to the atmosphere. Between its ends the venturi passage 28 is provided with the customary restriction 31 from which a tapered or outwardly flaring portion 32 of the passage extends toward the open end 30. The venturi passage 28 is supplied with gas under pressure from the valve chamber 9, by means of passage 33 formed in the upper body section 1b as shown in FIGS. 3 and 5. A jet nozzle 32 is mounted, as shown in FIG. 7, in the venturi passage 28 forwardly of the point of communication of the gas supply passage 33, as shown in FIG. 3, so that a jet of gas will be directed past a combined suction and by-pass port 35 leading from the passage 28 into the main chamber 7. The port 35 is located in the body section 1b between the nozzle 34 and the restriction 31 as shown in FIG. 7. When the venturi means is operated, it will create a partial vacuum or negative pressure in the port 35 and the main chamber 7 to effect the exhalation cycle of the resuscitator mechanism. It will now be seen that passages 28 and 33, together with the port 35, constitute parts of the total passage means formed in the body 1, whereby alternately gas may be directed into the main chamber 7 and the venturi chamber 28.

Means are provided to control the emission of gas from the main chamber 7 through the port 35 and venturi passage 28 to the atmosphere in order that the resuscitator mechanism may be operated solely to continuously produce a modified inhalation or insufflation operation, as well as operated cyclically to produce under pulmometric control, a normal resuscitation operation. A more detailed account of these operations will appear in the description of the operation of the resuscitator mechanism of this invention. As here shown, the control means for the port 35 comprises a plate-like member 37 which is fixed on the underside of the upper body section 1b so as to restrict flow of gas through this port. The amount of restriction is determined at the time of assembling and testing the mechanism by the manufacturer, and the member 37 is fixed in a predetermined position partly covering the intake end of the port 35.

Novel pulmometrically controlled fluid pressure operated means are provided in accordance with this invention to cyclically produce the inhalation and exhalation phases of a resuscitation operation. This means includes a member other than a diaphragm that is bodily movable responsive to differential fluid pressure. As here shown, this bodily movable means constitutes a cylinder and piston unit. Accordingly, an opening provided in the upper section 1b of the body 1 forms in the body section, a cylinder 38 of much smaller diameter than any diaphragm found in present-day resuscitators. An equally small skirted piston 39, for example, made of one of the plastics which is of fine, smooth texture and has self-lubricating characteristics, such as Teflon, is mounted to reciprocate in the cylinder 38. One end of the cylinder 38 opens into the main chamber 7, whereas the other end opens into the chamber 5 formed by the cover 1c. As the chamber 5 is open to the atmosphere and positive and negative pressures are developed in the chamber 7, it is seen that the piston will reciprocate responsive to the differential pressures developed at the open ends of the cylinder 38.

A valve 40 is operable in the valve chamber 9 to alternately direct flow of gas into the main chamber 7 and the venturi passage 28 responsive to reciprocation of the piston 39 and the operation of spring-loaded toggle mechanism 41 operatively connecting the valve 40 with the piston. The valve 40 includes a stem 42 slidable in a bore 43 in the upper body section 1b, there being valve members 44 and 45 on the stem arranged to be engaged with the seats 44' and 45' in the valve chamber 9. The seat 44' is at the mouth of the port 8 leading from the valve chamber 9 into the main chamber 7. The seat 45' is located in the valve chamber so that when engaged by the valve member 45 the flow of gas to the venturi passage 28 will be shut off.

The toggle mechanism 41 comprises a pair of toggle arms 47 and 48 having opposed bifurcated inner end portions 49 which extend into notches 50 in upstanding projections 51 fixed on the piston 39 thereby forming a hinge connection of the toggle arms with the piston. The outer end of the toggle arm 47 is bifurcated and straddles the valve stem 42 between nuts 52 and 52' threadedly adjustable on the stem. The outer end of the toggle arm 48 is bifurcated and straddles the upper end of a pin 53 threadedly mounted on the upper body section 1b. This end of the arm 48 is retained in place by means of a pair of axially spaced heads 54 on the pin 53. A spring 55 loads the arms 47 and 48 so that they will move with a snap action past center, responsive to but a small amount of movement thereof and a correspondingly small movement of the piston 39. The piston is limited in its movement by means of the stop members 56 and 57 adjacent opposite ends of the cylinder 38. With this arrangement, the valve 40 is operated with a quick snap action in moving from one position to the other.

It should be noted that the toggle mechanism 41 is much smaller and more compact than toggle mechanism employed with resuscitator control mechanism employing a diaphragm, due to the small diameter of the cylinder 38 and piston 39. Moreover, this toggle mechanism is on the exterior, that is, the upper side of the body 1 and is enclosed by the plastic cover or cap 1c which is light as to weight, in distinction to the arrangement provided in present-day resuscitators where the toggle mechanism is enclosed by a heavier metal section of the housing or body. Further, it is important to note that the body 1 may be made in elongated form facilitating the holding and manipulation of the resuscitator in properly applying the same to a patient and also providing for easy manipulation of the control valve 26.

In the operation of this resuscitator, gas under pressure entering the intake passage 16 when the valve 26 is open sufficiently for cyclical operation of the resuscitator, will flow into the valve chamber 9 through the port 17. Assuming that the parts of the mechanism are in the positions shown in FIG. 4 with the valve member 45 seated and the valve member 44 unseated, the gas will enter the main chamber 7 and pass through port 10 into the mask, thence into the lungs of the patient, thereby producing the inhalation phase of the resuscitator. During this phase the piston 39 is in the down position shown in FIG. 4. Also, during this phase some of the gas entering the chamber 7 will vent to the atmosphere through the combined suction and vent port 35 and the venturi passage 28. However, the volume of gas thus vented to the atmosphere in proportion to the volume passing to the patient is quite small due to the restriction of the port by the restriction member 37. Consequently, as long as the manually operable valve 26 is open to provide a flow sufficient to cyclically operate the mechanism, this venting of chamber 7 does not interfere with a normal resuscitation operation.

When the pressure building up in the patient's lungs on the inhalation cycle reaches a predetermined value considered in this art to be safe, this pressure is also present in the chamber 7 and is effective to move the piston 39 outwardly to the exhalation cycle position shown in FIG. 6. This movement of the piston 39 is aided by the toggle mechanism 41 which also causes the valve member 44 to be seated and the valve member 45 to be unseated. Gas from the valve chamber 9 now passes through the venturi supply passage 33 to actuate the venturi means whereby through the suction port 35 a subatmospheric or negative pressure is produced in the chamber 7, the mask 2, and the lungs of the patient, thereby effecting the exhalation phase.

During this exhalation phase, when a vacuum known in this art to be effective without danger of injury of the patient is reached in the main chamber 7, atmospheric pressure against the outer or upper end of the piston 39 becomes effective with the aid of the spring-loaded toggle mechanism, to move the piston back to the inhalation cycle position shown in FIG. 3, to again effect the inhalation phase.

As long as the valve 26 remains open an extent to produce the aforesaid pressure-effected movements of the piston 39, the mechanism will cyclically produce the inhalation and exhalation phases pulmometrically. Should a positive pressure considered unsafe be developed in the chamber 7 during an inhalation phase, the positive pressure safety valve 13 set at that pressure will open to relieve the excess pressure. Likewise, during an exhalation phase, the negative pressure safety valve 12 will open and relieve an unsafe negative pressure should such a pressure be developed in the chamber 7.

Should it be desired to operate this resuscitator for straight oxygen insufflation, the valve 26 is adjusted to reduce the flow of gas to the extent that the piston 39 will not respond to positive pressure in the chamber 7, whereby the resuscitator will operate on the inhalation phase. When the valve 26 reduces gas flow in this manner, the rate of escape of gas through the port 35 and venturi passage 28 to the atmosphere is such that there is insufficient pressure developed in the chamber 7 to shift the piston from inhalation position to exhalation position although a reduced flow to the patient's lungs will continue. Thus, at any time during the cyclical operation of the resuscitator or upon first starting operation of the mechanism with the valve 26 opened for a cyclical operation, if this valve is operated to reduce the flow of gas as above stated, the mechanism will stop with the piston 39 in the inhalation position for a continuous modified application of gas to the patient. The reopening of the valve 26 to the extent necessary to increase the flow of gas for cyclical operation of the resuscitator, readily may be effected at will as easily as the valve may be operated to produce the continuous inhalation operation.

Referring to FIGS. 9–17, a modified respiratory device is shown, including an elongate body 101 mounted in an elongate tubular housing 102 so that ends of the body close the ends of the housing. As will be hereinafter fully described, the body 101 contains the parts, chambers and passages comparable to those described with respect to FIGS. 1–8, necessary for operation of the device in insufflation resuscitation oxygen therapy or the like. The following reference to a resuscitator, accordingly, is not to be construed in a limiting sense.

On the ends of the body are fittings and controls to be hereinafter described, and on a side of the housing 102 near one end thereof, is an opening 103 providing for an operative connection of the resuscitator with a mask 104 or other means for establishing a gas flow circuit between the resuscitator and the lungs of a patient. A single set screw 103' is all that is required to hold the body 101 in the proper position in the housing 102.

When the intake fitting 105 one one end of the body 101 is connected with a gas supply line 106 leading from the source of supply of gas under pressure, not shown, the resuscitator is ready to be operated subject to control by means of manually operable valve means 107 on the other end of the body 101.

The housing 102 is preferably cylindrical and the ends of the body 101 are correspondingly shaped, as in cylindrical form the housing readily may be held in one hand and easily controlled for an efficient operation of the resuscitator. However, the housing could be of a shape other than cylindrical, and it is preferred that it be tubular whether oval or otherwise shaped in cross section. It is also desired that the body 101 and the housing not exceed 2 inches in diameter nor 3 inches in length, as within these proportions it is small, compact and readily may be held and controlled in one hand for an efficient application to a patient.

Referring more specifically to the body 101, it is seen that it consists of a pair of elongate generally complemental sections 101a and 101b preferably of lightweight die cast metal, fastened one upon the other with a suitable gasket 108 therebetween, by means of screw fastenings 109. The section 101a is provided at its ends with flanges 110 and 111 of semi-circular form. The section 101b is provided with similar end flanges 112 and 113 which, in complement with the flanges 111 and 110, respectively, form cylindrical closures for the housing 102, being preferably flush with the ends of the housing.

The plate-like portions of the body sections 101a and 101b between the end flanges thereof are comparatively thin and formed with only sufficient stock to accommodate the chambers and passages required. In this connection, it should be noted that the sections are preferably die cast so as to minimize the amount of metal required and eliminate bulk and weight, while providing all of the chambers and passages that are necessary with a minimum of machining operations.

The body section 101b is provided with a depression or cavity extending inwardly from the face thereof opposed to the section 101a, to form a main chamber 114 having at one end a short passage 115 leading into a hollow boss 116 on the other side of the section 101b. The bore of the hollow boss 116 registers with the opening 103 in the housing 102 and serves as a port for egress and ingress of gas with respect to the main chamber 114.

A tubular fitting 117 on the mask 104 is extended through the opening 103 and into the boss 116 so as to engage a sealing ring 118 in the latter and thereby detachably and operatively connect the mask with the body 101. Whether the mask 104, as here shown, or an endotracheal tube, not shown, is connected with the boss 116, it is apparent that provision is made for establishing a gas flow circuit between the main chamber 114 and the lungs of a patient.

The body sections 101a and 101b are provided with passage means for conducting gas under pressure into the main chamber 114. As shown in FIG. 14, this passage means includes an intake passage 120 extending longitudinally of the body section 101a adjacent one longitudinal edge portion thereof between the intake fitting 105 and the manually operable control valve 107. The intake fitting 105 is screwed into a screw threaded enlargement 121 at one end of the passage 120. The other end of the passage 120 is provided with a screw threaded enlargement 122 and a valve seat 123.

The control valve 107 comprises a screw threaded stem 124 axially adjustably engaged with the threaded enlargement 122 so that a needle valve element 125 on the stem 124 may be moved into and from engagement with the valve seat 123. A handle 126 on the stem 124 is operable exteriorly of the body section 101a to move the valve element 125 for controlling flow of gas through the passage 120. The handle 126 may be appropriately marked to indicate the rate of flow between on and off positions of the needle valve element 125, there being an index mark 127 (see FIG. 9) on the housing to enable the operator to determine when the handle 126 is in different flow control positions. The handle 126 and the index mark 127 are located so that while the resuscitator is held in one hand, the thumb and first finger may grip and manipulate the handle with the index and handle in full view of the operator.

The passage means leading to the main chamber 114 also includes (see FIGS. 14 and 16) a port 128 in the enlarged end portion 122 of the passage 120 for communicating the latter with a groove-like passage 128' formed in the body section 101b and leading into a valve chamber 129. This valve chamber is formed complementally in the opposed portions of the body sections 101a and 101b, as shown in FIGS. 12 and 13. The portion of the valve chamber in the section 101b is provided with a port 130 leading into the interior of the hollow boss 116, which latter communicates with the main chamber 114 through the short passage 115.

The body section 101a is also provided with venturi means for creating a negative or sub-atmospheric pressure in the main chamber 114. As shown in FIG. 14, this venturi means comprises a combined venturi and vent passage 131 extending longitudinally of the section 101a adjacent the edge portion thereof opposite the edge portion containing the intake passage 120. A screw plug 132 is employed to close the screw threaded end portion of the passage 131 that terminates in the flange 111, after threading a screw threaded venturi jet nozzle 133 into proper position in this portion of the passage 131. The other end of the passage 131 in the flange 110 is open to the atmosphere through a flanged tubular insert 131' positioned therein so that the flanged end projects outwardly from the flange 110 for a purpose to be hereinafter described. The portion of the passage 131 between the insert 131' and the nozzle 133 is reduced as at 135 and tapered as at 136 in the usual manner in a venturi jet passage so as to be operable for creating a negative pressure in the chamber 114. The venturi passage is provided with a combined vent and suction port 137 communicating with a groove-like passage 138 (see FIGS. 13 and 15) in the section 101b leading into the main chamber 114.

Gas under pressure is directed, as shown in FIG. 14, into the venturi passage 131 at a point between the plug 132 and the nozzle 133 through a port 139 leading from that part of the valve chamber 129 located in the body section 101a.

Gas-operated, pulmometrically controlled means are provided to control the flow of gas from the valve chamber 129 alternately into the venturi passage 131 and into the main chamber 114 and mask 104. This means includes a bodily movable element, here shown as a small piston 140, a valve unit 141 in the valve chamber 129, and a spring loaded toggle mechanism 142 connected with the piston 140 and the valve unit 141 to effect a snap action of the latter responsive to reciprocation of the piston.

The piston 140 may be made of any suitable material. A plastic known as Teflon has been found to be suitable for forming a small piston of light weight, for example, less than one inch in diameter, and having a short skirt of less length than that of the cylinder formation 143 in which the piston is operable. This cylinder formation is located centrally of the body section 101a and is open at both ends, one end being in communication with the main chamber 114, and the other in communication with a chamber 144 formed between the portion of the body section 101a between end flanges 110 and 111 and the housing 102. Ports 145 in the end flange 110, as shown in FIGS. 10, 12 and 13, communicate the chamber 144 with the atmosphere.

The toggle mechanism 142 comprises a pair of toggle arms 146 and 147 having opposed bifurcated end portions 148 which extend into notches 150 in upstanding projections 151 fixed on the piston 140 by means of the fastening 152, thereby providing a hinge connection of the toggle arms with the piston. The outer end of the toggle arm 146 is bifurcated and straddles the stem 153 of the valve unit 141 between nuts 154 and 155, adjustable on the stem. The outer end of the toggle arm 147 is bifurcated and straddles the upper end of a screw member 156 axially adjustably mounted on the body section 101a. This bifurcated end is retained in place between axially spaced heads 157 on the member 156.

A spring 158 loads the toggle arms 146 and 147 so that they will move with a snap action past center in response to movement of the piston 140.

The piston 140 is limited in its movement away from the chamber 114 by a stop member 159 axially adjustably mounted on the body 101a so as to engage the toggle arm 146. An adjustable stop 160 on the body section 101b extends into the main chamber 114 to limit movement of the piston 140 toward the main chamber. Both of the stops are readily adjustable exteriorly of the body while the body sections are fastened together as a unit.

The valve stem 153 of the valve unit 141 is slidable in an opening 161 in the upper portion of the valve chamber 129 and is provided with axially spaced valve members 162 and 163 arranged to engage valve seats 164 and 165, respectively. The seat 164 is at the mouth of the port 130 leading into the hollow boss 116, and is controlled by the needle valve member 162. The seat 165 is located in the portion of the valve chamber 129 that is in the body section 101a and is engageable by the valve member 163 to control flow through the port 139 into the venturi passage 131.

A conventional spring-loaded negative pressure safety valve unit 167 is threaded into an opening 168 in the body section 101b so as to be exposed to the chamber 114, this valve being set, as is customary in this art, to open should a negative pressure considered unsafe be developed in the chamber 114. The valve unit 167, when open, communicates the chamber 114 with a chamber 169 formed between that part of the body section 101b between the end flanges 112 and 113 and the housing 102, there being openings 170 in the end flange 113, as shown in FIG. 10, to communicate the chamber 169 with the atmosphere.

A combined inhalation and positive pressure spring-loaded safety valve unit 172 of conventional form is threaded into an opening 173 in the end flange 113 of the body section 101b, the opening 173 communicating this valve unit with an extension 114' of the main chamber 114. The valve unit 172 is set to open and communicate the main chamber 114 with the atmosphere through valve unit ports 175 in case a positive pressure above that considered safe is developed in the main chamber 114. When the outer shell 176 of the valve unit 172 is unscrewed, ports 177 in the body 178 of the valve unit will be uncovered, thereby communicating the main chamber with the atmosphere and rendering the cyclical mechanism inoperable. This adjustment is used for straight oxygen therapy where the patient breathes as desired.

Means are also provided in this form of the invention whereby the resuscitator may be operated solely to produce a modified inhalation or insufflation operation with a slow rate of gas flow to the patient and, as here shown, comprises a baffle member 179 operable in conjunction with the combined suction and vent port 137. The baffle member 179 is in the form of a screw threaded into a bore 180 formed in the body section 101b and leading into the passage 138 opposite the port 137. The inner end of this baffle screw is disposed at one end of the port 137 and is of such diameter as will restrict flow from the passage 138 into the port 137. The other end of the baffle screw 179 is disposed exteriorly of the body section 101b where it may be adjusted at the factory to allow gas to escape to the atmosphere at all times through the passage 131 in such amount as will not interfere with cyclical operation of the resuscitator when the control valve 107 is set to allow a flow rate into the resuscitator for effecting a cyclical operation thereof. If the valve 107 is adjusted to appreciably reduce the flow rate, for example, almost to the point of shutting off the flow past the valve, the amount of gas escaping through the port 137 and passage 131 to the atmosphere makes the pressure in the main chamber insufficient to cause the piston 140 to shift and produce an exhalation phase. Thus, when the flow rate is reduced to the extent rendering the resuscitator incapable of cyclical operation, a modified continuous inhalation or insufflation phase is effected. This modified inhalation phase is used for a safe and effective administering of gas to premature infants and small animals, as well as for maintaining lung inflation during thoracic surgery. A lock nut 181 on the baffle screw 179 will hold the screw in the factory adjusted position.

It will now be apparent that the piston 140 and the main chamber 114 form an expansible chamber whereby the piston will move in one direction under positive pressure in chamber 114 and in the opposite direction when a negative pressure is developed in the chamber 114. This expansible chamber operates satisfactorily for all general uses of the resuscitator except where newly born infants are concerned, in which case the small trachea of such an infant will not accommodate flow of gas to the lungs, although the resuscitator is adjusted to operate at the slowest respiratory rate. The resistance to flow of gas into the lungs of very small newly born infants will cause a premature build-up of pressure in the chamber 114 and produce an exhalation cycle before the lungs of the infant are properly inflated. Accordingly, as shown in my pending application for U.S. Letters Patent, Serial No. 748,422, filed July 14, 1958, an auxiliary expansible chamber is coupled in circuit with the main chamber to make it possible safely and effectively to resuscitate very small newly born infants. Such an auxiliary chamber as indicated at 182 in FIG. 17, and comprising a housing 183 containing an inflatable bag 184 and a control screw 185 engaging the bag, may be used with the present resuscitator. For this purpose, the flange 110 of the body section 101a is provided with a fitting 186 communicated with the port 187 which leads through the body section 101a to the chamber 114, whereby a gas flow circuit may be provided through a hose 188 between the chamber 114 and the auxiliary chamber 182.

As the auxiliary chamber 182 is coupled with the main chamber 114, it is seen that the chamber 182 must be filled with gas, as well as the main chamber 114, before a pressure will be developed for operating the piston 140 to effect the exhalation phase. Likewise, the chamber 182 must be evacuated when the lungs of the patient and the chamber are evacuated, before a negative pressure is reached permitting the piston to move to inhalation position. Accordingly, the time required for these actions makes it possible for the resuscitator to be operated at a slow respiratory rate such that the tiny trachea of newborn infants will pass gas to and from the lungs in a manner assuring effective artificial respiration. When the chamber 182 is not in use, the fitting 186 may be closed and sealed with a removable elastic cap or similar closure 189. When the chamber 182 remains attached, a valve 190 in the hose 188 may be operated to cut in or cut out the chamber 182.

The operation of the device of FIGS. 9–17 is similar to the operation of the device shown in FIGS. 1–8 and, therefore, need not be reiterated, except to note that in both cases the cylinder and piston form in conjunction with the toggle mechanisms, pulmometrically controlled, gas-operated means operable incident to above atmospheric and subatmospheric pressure in the respective chambers 7 and 114 for establishing a gas flow circuit between said chambers and the lungs of a patient.

I claim:

1. Respiratory apparatus comprising: a body having a gas chamber and passageways communicating with said gas chamber for admitting gas thereto and for establishing a gas flow circuit between said chamber and the lungs of a patient; venturi means operable for developing negative pressure in said chamber, gas-operated means for controlling the flow of gas through said chamber; said gas-operated means including a cylinder communicating with said chamber at one end and with atmosphere at the other end; and a plastic piston reciprocable in said cylinder incident to above atmospheric and sub-atmospheric gas pressures in said chamber, said plastic piston being made of a plastic which has a fine, smooth texture with self-lubricating characteristics, said gas-operated means including valve means for alternately directing gas through said passageways to said chamber and to said venturi means, and means connected with said piston and said valve means for so actuating said valve means responsive to said reciprocation of said piston.

2. Respiratory apparatus comprising: a body having a gas chamber and passageways communicating with said gas chamber for admitting gas thereto and for establishing a gas flow circuit between said chamber and the lungs of a patient; venturi means operable for developing negative pressure in said chamber, gas-operated means for controlling the flow of gas through said chamber; said gas-operated means including a cylinder communicating with said chamber at one end and with atmosphere at the other end; and a piston reciprocable in said cylinder incident to above atmospheric and sub-atmospheric gas pressures in said chamber, and means for adjusting the stroke of said piston, said gas-operated means including valve means for alternately directing gas through said passageways to said chamber and to said venturi means, and means connected with said piston and said valve means for so actuating said valve means responsive to said reciprocation of said piston.

3. Respiratory apparatus comprising: a body having a gas chamber and passageways communicating with said gas chamber for admitting gas thereto and for establishing a gas flow circuit between said chamber and the lungs of a patient; venturi means operable for developing negative pressure in said chamber, gas-operated means for controlling the flow of gas through said chamber; said gas-operated means including a cylinder communicating with said chamber at one end and with atmosphere at the other end; and a plastic piston reciprocable in said cylinder incident to above atmospheric and sub-atmospheric gas pressures in said chamber, said plastic piston being made of a plastic which has a fine, smooth texture with self-lubricating characteristics and means for adjusting the stroke of said piston, said gas-operated means including valve means for alternately directing gas through said passageways to said chamber and to said venturi means, and means connected with said piston and said valve means for so actuating said valve means responsive to said reciprocation of said piston.

4. Respiratory apparatus comprising: a body having a gas chamber and passageways communicating with said gas chamber for admitting gas thereto and for establishing a gas flow circuit between said chamber and the lungs of a patient; venturi means operable for developing negative pressure in said chamber, gas-operated means for controlling the flow of gas through said chamber; said gas-operated means including a cylinder communicating with said chamber at one end and with atmosphere at the other end; and a plastic piston reciprocable in said cylinder incident to above atmospheric and sub-atmospheric gas pressures in said chamber, said plastic piston being made of a plastic which has a fine, smooth texture with self-lubricating characteristics and means for adjusting the stroke of said piston, said adjusting means operable while said apparatus is functioning, said gas-operated means including valve means for alternately directing gas through said passageways to said chamber and to said venturi means, and means connected with said piston and said valve means for so actuating said valve means responsive to said reciprocation of said piston.

5. A resuscitator comprising: a body having a main chamber and a port for passing of gas to and from said chamber; a tubular housing surrounding said body; said body having end portions closing the ends of said housing; said housing having an opening affording communication of said port with means for forming a gas flow circuit between the lungs of a patient and said chamber; said body having an intake passage with one end opening through one of said end portions for connection with a source of gas under pressure; said body having a venturi passage open at one end to the atmosphere through one of said end portions; said body having a combined suction and vent port communicating said main chamber with said venturi passage; venturi means in said venturi passage operable for creating a negative pressure in said main chamber through said suction port; said body having passage means for communicating said intake passage with said main chamber as well as with said venturi passage; a manually operable valve in said body for controlling flow through said intake passage operable on the exterior of said housing; cyclically operable valve means for alternately directing gas through said passage means to said main chamber and to operate said venturi means; means providing a second chamber within said housing in communication with the atmosphere; and pulmometrically controlled, gas-operated means connected with and operable to so actuate said valve means in response to differential gaseous pressures in said chambers.

6. A resuscitator comprising: a tubular housing open at both ends; an elongate body insertable and removable endwise through an open end of said housing; said body having a main chamber and a port for passing gas into and from said chamber; said body having end portions closing the open ends of said housing; said housing having an opening affording communication of said port with means for forming a gas flow circuit between said chamber and the lungs of a patient; said body having an intake passage with one end opening through one of said end portions for connection with a source of gas under pressure; said body having a venturi passage open to the atmosphere at one end through one of said end portions; said body having a combined suction and vent port communicating said main chamber with said venturi passage; venturi means in said venturi passage operable to create a negative pressure in said chamber through said suction port; passage means in said body for communicating said intake passage with said venturi passage and said main chamber; a flow control valve for said intake passage operable on the exterior of one of said end portions; cyclically operable valve means for alternately directing gas through said passage means to said main chamber and for operating said venturi means; there being a second chamber in said housing between end portions of said body; one of said end portions having an opening communicating said second chamber with the atmosphere; said body having a cylinder formation having ends thereof open to said chambers; a piston reciprocable in said cylinder in response to differential pressures in said chambers; and spring loaded toggle mechanism operatively connecting said piston with said cyclically operable valve means for operating the latter in response to reciprocation of said piston.

While specific structural details have been shown and described, it should be understood that changes and alterations may be resorted to without departing from the spirit of the invention as defined in the appended claims.

References Cited in the file of this patent

UNITED STATES PATENTS

| | | |
|---|---|---|
| 1,302,538 | Gulick | May 6, 1919 |
| 2,408,136 | Fox | Sept. 24, 1946 |
| 2,536,435 | Fox | Jan. 2, 1951 |